United States Patent [19]
Bruckert et al.

[11] Patent Number: 5,305,468
[45] Date of Patent: Apr. 19, 1994

[54] POWER CONTROL METHOD FOR USE IN A COMMUNICATION SYSTEM

[75] Inventors: Eugene J. Bruckert, Arlington Heights, Ill.; Fuyun Ling, Jamaica Plain, Mass.

[73] Assignee: Motorola, Inc., Schaumburg, Ill.

[21] Appl. No.: 853,211

[22] Filed: Mar. 18, 1992

[51] Int. Cl.⁵ .............................................. H04B 7/005
[52] U.S. Cl. .................... 455/69; 455/38.3; 455/54.1; 455/67.1; 455/115
[58] Field of Search ...................... 455/33.1, 38.3, 53.1, 455/54.1, 56.1, 67.1, 68, 69, 70, 115, 127, 126

[56] References Cited

U.S. PATENT DOCUMENTS

| | | | |
|---|---|---|---|
| 4,222,115 | 9/1980 | Cooper et al. | 375/1 |
| 4,228,538 | 10/1980 | Scharla-Nielsen et al. | 455/9 |
| 4,261,054 | 4/1981 | Scharla-Nielsen | 455/12 |
| 4,613,990 | 9/1986 | Halpern | 455/54.1 |
| 4,811,421 | 3/1989 | Havel et al. | 455/69 |
| 5,056,109 | 10/1991 | Gilhousen et al. | 375/1 |

Primary Examiner—Reinhard J. Eisenzopf
Assistant Examiner—Philip J. Sobutka
Attorney, Agent, or Firm—Raymond J. Warren

[57] ABSTRACT

The power of a received signal is measured at a base station. This measured power is used to predict a future power level of the received signal and from that to determine the appropriate power adjustment command. The power adjustment command is then sent to the transceiver.

15 Claims, 3 Drawing Sheets

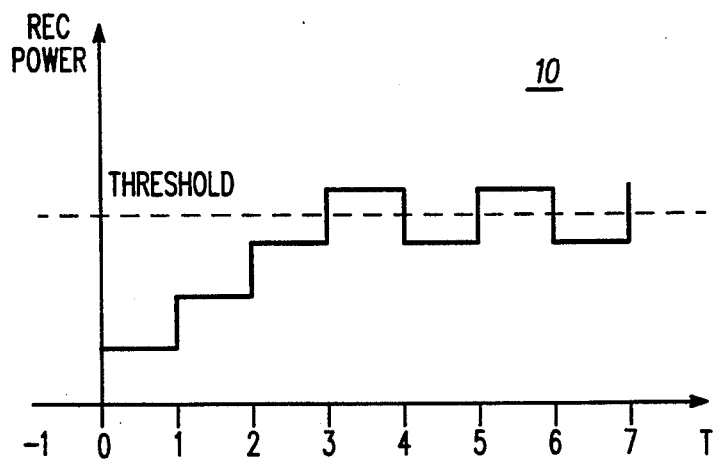
FIG.1 —PRIOR ART—
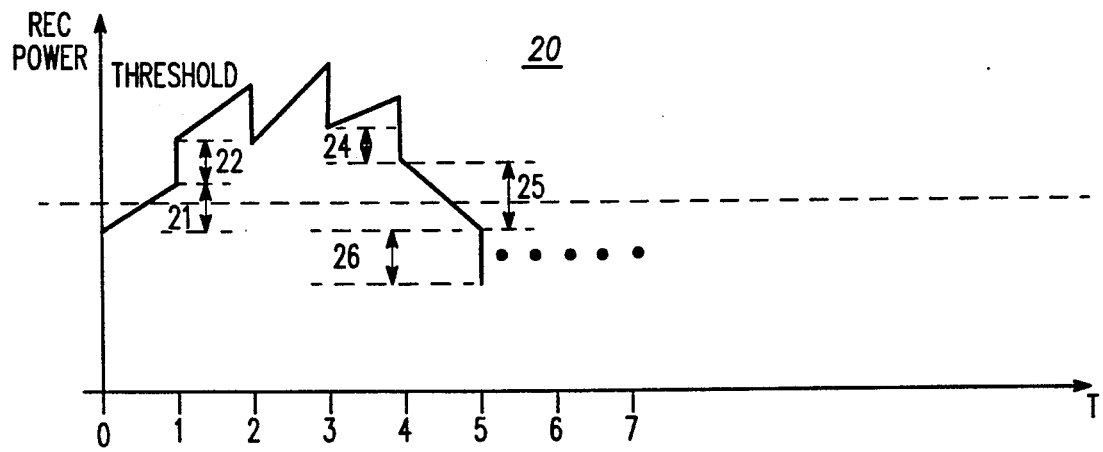
FIG.2 —PRIOR ART—
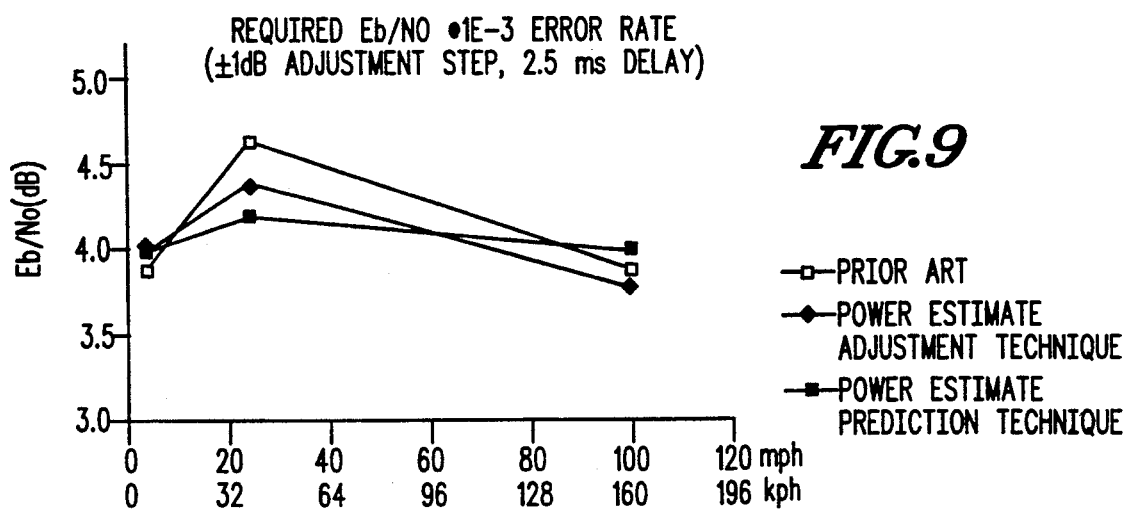
FIG.9

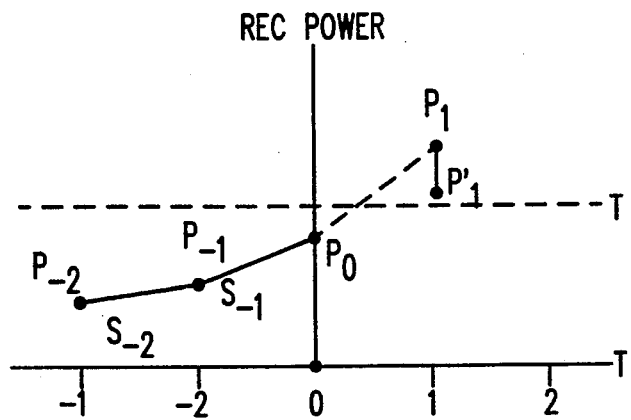
FIG.3
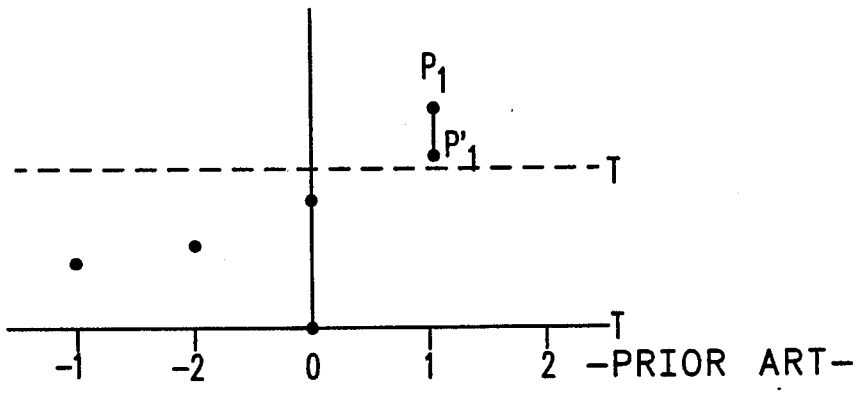
FIG.4 —PRIOR ART—
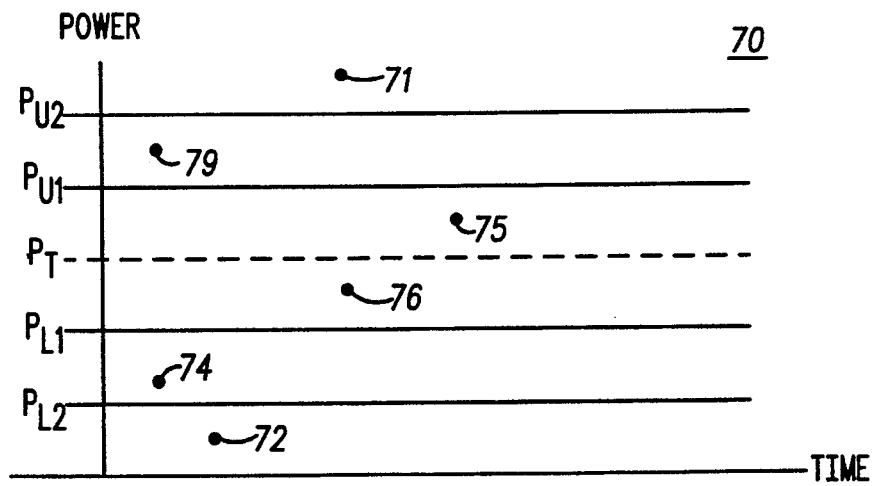
FIG.8

POWER CONTROL METHOD FOR USE IN A COMMUNICATION SYSTEM

FIELD OF THE INVENTION

The present invention relates, in general, to communication systems and, more particularly, to a power control method for use in a communication system.

BACKGROUND OF THE INVENTION

Presently, power control in cellular communication systems is handled in a reactive manner. First, power measurements are made of the received signal at a present time. A power adjustment command is then sent to adjust the transmitter power moving it toward some threshold value. Because of transmission delays, the adjustment is actually made at a future time. If the received power is in the process of changing between the present time, at which the measurement is taken, and the future time, when the power adjustment is implemented, the adjustment based upon present time measurements can result in over adjustment.

By way of example, we will use the situation where the transmitter is a mobile subscriber moving toward a base station. As the mobile proceeds toward the base station, the received signal power measured at the base station will increase, assuming that the mobile output power is fixed. If the received power is measured as low at the present time, the base station will direct the mobile to increase its power. However, since the mobile is moving toward the base station, the receive power will be increasing anyway. At points where the power is close to a maximum threshold, the directed increase, combined with the increase due to the movement of the mobile, will result in the receive power being pushed past the maximum threshold.

Because there is a time delay between the power measurement time and the power adjustment time, any previous power adjustments executed during this period also cause unwanted results. The effect of this delay is illustrated by the fact that the power measurement is made at time $t_0$. A power adjustment command, based upon the $t_0$ measurement, is then sent which reaches the subscriber at some time $t_x$. In the interim between $t_0$ and $t_x$, the subscriber has received and implemented other adjustment commands. Thus the power adjustment command based upon the $t_0$ is often the incorrect adjustment for the actual power at $t_x$.

SUMMARY OF THE INVENTION

The present invention relates to a method for controlling the power output of a transceiver. This is accomplished by first measuring the power of a received signal. The power value is used to predict a future power value which is used to determine an appropriate power adjustment command. The power adjustment command is then sent to the transceiver.

BRIEF DESCRIPTION OF THE DRAWINGS

FIG. 1 is a graph of a prior art power control method operating in a static environment;

FIG. 2 is a graph of the prior art power control method of FIG. 1 in a dynamic environment;

FIG. 3 is a graph of a power control method embodying the present invention;

FIG. 4 is a second graph of the prior art power control method of FIG. 1;

FIG. 8 is a graph illustrating a power control method embodying the present invention; and FIG. 9 is a graph of the signal-to-noise ratio versus miles/kilometers per hour.

DESCRIPTION OF A PREFERRED EMBODIMENT

Figure 5:
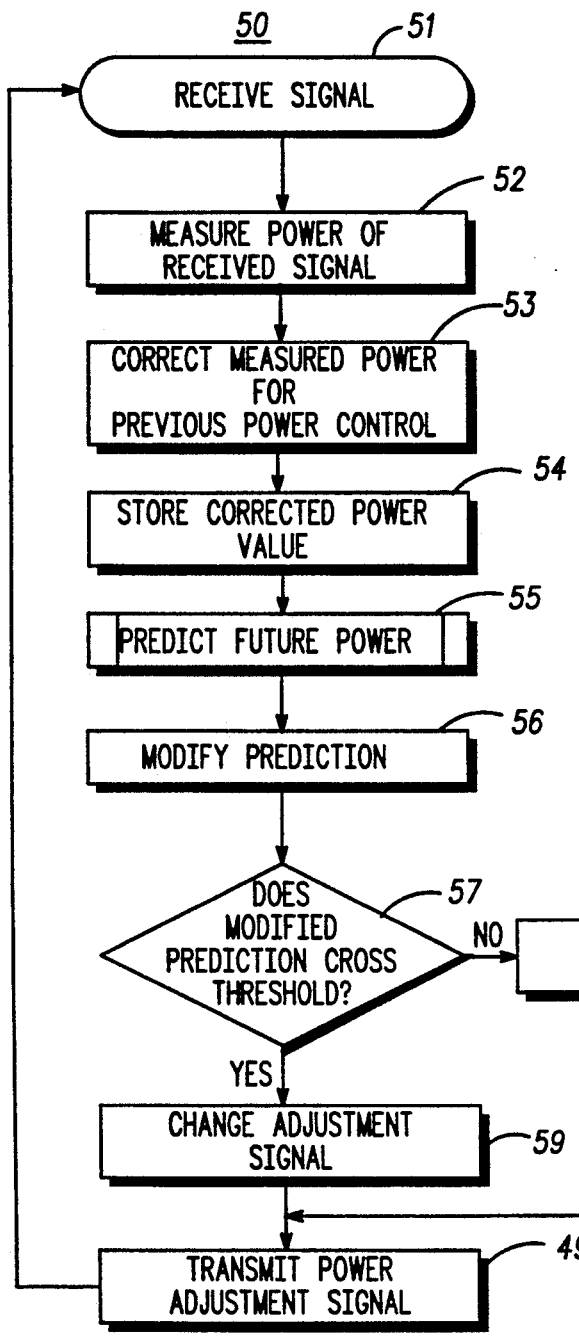
FIGS. 5 and 6 are process flow charts illustrating a method embodying the present invention.

Referring initially to FIG. 1, a graph, generally designated 10, of a prior art power control method is illustrated. In this example, a static environment is presented where neither the receiver nor transmitter is moving relative to the other. The abscissa of the graph is time and the ordinate is received power at the base station. A threshold power level is represented by the dashed line parallel to the abscissa. The objective of the power control process is to maintain the received power at, or close to, the threshold level.

Presently, power control is performed by the base station. The power of a signal is first measured by the base station. If the power level is below the threshold, then a signal is sent to the transmitter to increase power. If the power measured at the base station is above the threshold, a signal is sent to the transmitter to decrease power. Currently, because of limited overhead in the communication channels, either an increase or decrease power control command must be sent. In other words, a zero power control command may not be sent. In addition, there is no option available for not sending a power control command. The increase and decrease power adjustments are typically of the same magnitude in decibels, with opposite signs, and must be transmitted.

In operation, because the received power measured at $T_0$ is below the threshold, a power increase command is sent out. At $T_1$, the mobile has responded by increasing the power. However, it is still below the threshold. Therefore, at $T_1$, another increase power command is sent out. This is continued until the measured power exceeds the threshold value, as at $T_3$. At this point, the system directs the transmitter to decrease power. Since the measured power is now below the threshold, at $T_4$, it will direct the transmitter to increase power. This process would continue throughout the call.

The above process is complicated when the controlled transmitter is in a mobile subscriber. If the mobile subscriber is approaching the base station, the received power level will increase, even if the transmit power is constant. The problem that arises with the present power control method is illustrated in the graph, generally designated 20, of FIG. 2. Here, the power measurement at $T_0$ indicates that the receive power is below the threshold. Therefore, a power increase command is sent to the transmitter. Between $T_0$ and $T_1$, the transmitter has moved close enough to the receiver that the received power would be above the threshold, even without adjustment. When adjusted in the positive direction as a result of the measurement at $T_0$, the received power level would overshoot the threshold level at $T_1$. The received power level at $T_1$ has increased by an amount identified by the number 21 due to the movement of the mobile unit. The received power level at $T_1$ has also increased by an amount identified by the number 22 due to the power adjustment command sent out after $T_0$.

Since the power level is above threshold at time $T_1$, the base station will send out a decrease power command to the mobile. If we assume that the rate of increase in power due to the movement of the mobile is equal to the decrease in power from the power command, then the changes will offset each other and the power received at the base station will not change at $T_2$. If the rate of increase due to the movement of the mobile is in excess of the decrement amount, a net increase in power will result. This is illustrated at time $T_3$. Once the mobile stops, or reaches the point where there is little increase in power due to its movement, the decrease power command will have more of an effect, as shown at time $T_4$. The amount of decrement is illustrated by the reference number 24.

When the mobile is moving away from the base station, the movement will result in a decrease in the power received at the base station. As illustrated at $T_5$, the mobile is moving away from the base resulting in a drop in power that would place the receive power level below the threshold level, reference number 25. However, because the power level at $T_4$ was still above the threshold, a decrease power command was sent out. This results in an additional reduction in power illustrated by reference number 26. The result is that the power is reduction when it should have been increased.

Therefore, as illustrated in the adjustments at times $T_1$ and $T_5$, a problem is created by sending out reactive power adjustment commands. A solution to this problem is illustrated in FIG. 3. Here, power (P) readings were taken at time $T_{-2}$, $T_{-1}$, and $T_0$. These readings were modified for any previous power control adjustments made to provide power readings $P_{-2}$, $P_{-1}$, and $P_0$, respectively. These power measurements are then used to calculate the slope (S) of the power change between points. The slopes are identified as $S_{-2}$ between $P_{-2}$ and $P_{-1}$, and $S_{-1}$ between $P_{-1}$ and $P_0$. The two slopes $S_{-2}$ and $S_{-1}$ are then used to calculate the rate of change of the unadjusted power level. Knowing $P_0$, $S_{-1}$, and the rate of change of the power, the system can estimate $P_1$ at time $T_1$. A power adjustment command is then sent out based upon the anticipated level of $P_1$. In the present example, the power level at $P_0$ is below the threshold value. In a prior art system, illustrated in FIG. 4, an increase power command would be transmitted resulting in the power increasing to $P_1''$ from $P_1$. Since the power was going to exceed threshold by the time the adjustment was made, this would have been an incorrect action. The present invention would have accounted for the expected future value and sent out a decrease power command causing the power of the mobile to decrease from $P_1$ to $P_1'$.

Referring now to FIG. 5, a flow chart illustrating a process, generally designated 50, utilized in the present invention is shown. Process 50 will commence at step 51 when a signal is received. The power of the received signal is then measured, step 52, and corrected for previous power control adjustments, step 53. It should be understood that when the power of the received signal is measured, it is the average power over a particular time period that is being determined. Once the power signal has been corrected, this corrected value is stored, step 54. This value may be stored in any register, memory, or like device.

Once the power value has been stored, process 50 will use this information to predict a future power level of the signal. This is accomplished in subprocess 55, described in detail below. The predicted power is then modified based upon previous power control commands, step 56.

Next, process 50 determines if the modified predicted power of the signal crosses a threshold level. If it does not cross a threshold level, then no change in the adjustment command is made, step 58. However, if the predicted value does cross the threshold value, the sign of the power control command is changed, or switched, step 59. The power control command is then transmitted to the mobile transceiver, step 49. Following either of steps 58 or 59, the system returns to step 51.

In step 53, the current measured power levels are adjusted for previous power control commands. One method of performing this adjustment is with equation (1).

$$p'(n) = g(n-1)g(n-2)p(n) \qquad (1)$$

where:
  $p'(n)$ is the adjusted power estimate (in dB);
  $g(n-1)$ and $g(n-2)$ are the adjustments of the measurement based on previous gain controls; and
  $p(n)$ is the current power measurement (in dB) being adjusted.

Since there is a delay present in the power control loop, the correction performed must take into account power control commands which were previously sent, but not yet implemented by the mobile unit. Assuming a time delay of about 2.5 ms and a transmission interval of the power control bits of 1.25 ms, the current power measure can lag the previous adjustments by two. Therefore, the current power measurement is adjusted for the two previous gain control adjustments.

In testing equation (1) it was found that the adjustments of the measurements should be related, but not be exactly equal, to the previous power control increments. For example, to obtain preferable results in a situation where adjustments are made at $\pm 1$ dB, it was found that half of this value, $\pm 0.5$ dB, provided a closer estimate of the signal.

Figure 6:
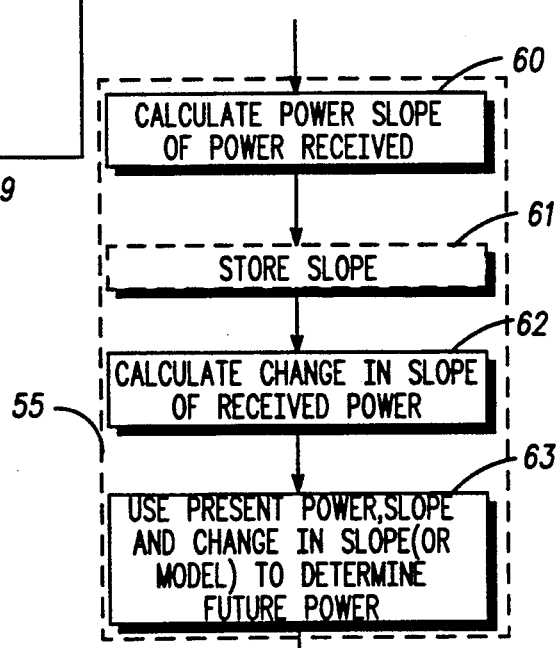

An example of subprocess 55 used to predict the future power of the received signal is illustrated in FIG. 6. In this example, a simple second order linear predictor is used to determine the future value. This commences at step 60 by calculating the power slope ($S_{-1}$) of a line between the present power level and a power level measured at time $T_{-1}$. The power slope determined in step 60 may optionally be stored, step 61. Step 61 is optional since it would save processing time in that the power slope would not have to be calculated each time through subprocess 55. However, if storage space is more of a concern to the designer, this value may be calculated from the stored power values, step 54.

After calculating the power slope ($S_{-1}$), the change in power slope is calculated, step 62, between slope $S_{-1}$ and a previous power slope, $S_{-2}$, of a line between the power level measured at $T_{-2}$ and $T_{-1}$. The present power value, power slope, and change in power slope are then used to determine the future power level.

Figure 7:
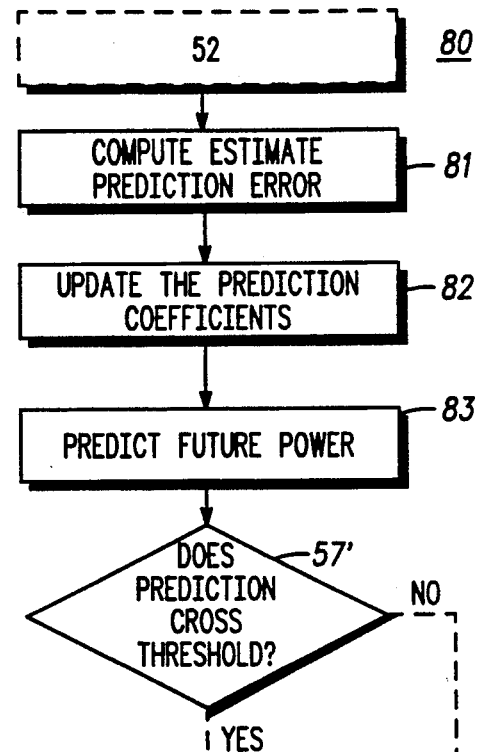
FIG. 7 is a process flow chart illustrating a second method embodying the present invention.

Another example of performing the prediction is illustrated in the flow chart, illustrated in FIG. 7, of a second process, generally designated 80, embodying the present invention. This process uses an adaptive linear prediction approach to predict power estimates. Process 80 commences following step 52 of process 50, FIG. 5.

In step 81, process 80 computes an estimate of the prediction error. The estimate of the prediction error can be computed using equation (2).

$$e(n) = p(n) - q(n) \qquad (2)$$

where:
e(n) is the estimate prediction error;
p(n) is the current power measurement; and
q(n) is the prediction value computed according to the previous prediction coefficients $c_k(n-1)$ and the previous power measurement $p(n-k)$, $k=1,2,\ldots M$, such that:

$$q(n) = \sum_{k=1}^{M} c_k(n-1)p(n-k) \qquad (3)$$

where:
$c_k(n-1)$ is the previous prediction coefficient; and
$p(n-k)$ is the power estimate measurement.

Next, the prediction coefficients $c_k(n)$ are updated in step 82. This is accomplished using adaptive processing (e.g. a least means square method) in order to minimize the mean squared error between q(n) and p(n). The coefficients are updated according to equation (4).

$$c_k(n) = c_k(n-1) + \Delta p(n-k)e(n): k=1,2,\ldots,M \qquad (4)$$

where:
$c_k(n)$ is the prediction coefficient;
$c_k(n-1)$ is the previous prediction coefficient;
$\Delta p(n-k)$ is adaptation step size which can be chosen from $aE[p^2(n)]$ where: a is a small constant (e.g. 0.001 to 0.005); M is the number of coefficients (e.g. 5); and $E[p^2(n)]$ is the mean square value of p(n); and
e(n) is the estimate prediction error determined using equation (2).

The coefficients are then used to predict the future power, step 83, using equation (5).

$$q(n+1) = \sum_{k=0}^{M-1} c_k(n)p(n-k) \qquad (5)$$

where:
q(n+1) is the predicted future power;
$c_k(n)$ is the current prediction coefficient; and
$p(n-k)$ is the power measurement.

Process 80 then proceeds to decision step 57' which differs from step 57, FIG. 5, in that the predicted future power, q(n+1), is compared with the threshold rather than modified prediction used in process 50.

In the above embodiment described by equations (2) through (5), the power measurements p(n) and p(n−k) may be replaced by the adjusted power measurement p'(n) and p'(n−k), respectively.

In FIG. 9, a graph is provided showing the signal-to-noise ratio (SNR) for a power adjustment technique; a power estimating technique as described in conjunction with FIGS. 5 and 6; and a power prediction technique as described in conjunction with FIG. 8. As shown, the power adjustment technique provides improved SNR at speeds above 20 mph. The prediction technique provides an improvement over the power adjustment technique from 10 to 70 mph; and provides improvement over the prior art between 20 and 85 mph.

While the proceeding examples have illustrated simple second order linear predictors and one step adaptive linear predictions, it will be understood that many different means of predicting the future power level may be used. For example, if the delay in the power control loop is large enough, a two step prediction could be utilized. Alternatively, in a base station located near a main thoroughfare, the power levels of the mobiles may follow a predictable bell shaped curve. The predictor used to anticipate future points could be set up to use the bell shaped curve as a model. Artificial intelligence or fuzzy logic may also be utilized to learn from a history of actual power control variations and develop a model to predict power levels of mobile units.

With regard to the power adjustment steps of FIG. 5, it should be noted that decision step 57 and processing steps 58 and 59 are based upon the current restraint that the adjustment command must be either an increase or a decrease. If other power adjustments are made available, then the present system may take advantage of these.

For example, the transceiver can be configured such that the increase and decrease commands are of different magnitudes. This has been shown to provide faster, more efficient power control.

In addition, if a zero adjustment is permitted, the system could determine if the predicted power falls within a particular range. If the power does, then no adjustment will be made. This is illustrated in graph 70 of FIG. 8. Here, the threshold power level is identified as $P_T$, an upper range as $P_{U1}$, and a lower range as $P_{L1}$. If a predicted power value falls between $P_{U1}$ and $P_{L1}$ (points 75 or 76), then no power adjustment will be made.

With additional power control values, the system would be capable of providing power control adjustment instructions of varying magnitude. For example, graph 70 also shows a second upper level $P_{U2}$ and a second lower level $P_{L2}$. If a predicted power value is above $P_{U2}$ (point 71) or below $P_{L2}$ (point 72), then a larger adjustment would be made to the power level than if the predicted value was between $P_{U2}$ and $P_{U1}$ (point 73) or $P_{L1}$ and $P_{L2}$ (point 74).

Thus, it will be apparent to one skilled in the art that there has been provided in accordance with the invention, a power control method for use in a communication system that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:
1. In a communication system, a method for controlling a power output of a transceiver comprising the steps of:
receiving a signal at a control site from said transceiver;
measuring a power value of said signal;
determining a power adjustment command based upon said power value, a first previous power value, a power slope representing a change of said power value of said signal, and a change in power slope representing a rate of change of said power value of said transmitted signal; and transmitting said power adjustment command to said transceiver.

2. The method of claim 1 wherein said step of determining a power adjustment command comprises the steps of:
calculating said power slope of said signal using said power value and said first previous power value;
calculating said change in power slope of said signal using said power slope and a previous power slope determined using said first previous power value and a second previous power value; and
predicting a next power value of said signal using said power value, said power slope, and said change in power slope.

3. The method of claim 2 wherein each of said power values is an average power value of said signal.

4. The method of claim 3 wherein each of said measured average power values is modified to compensate for a previous adjustment.

5. The method of claim 1 wherein said power adjustment command is one of a first adjustment command having a first sign and a first magnitude, and a second adjustment command having a second signal opposite said first sign and a second magnitude different from said first magnitude.

6. In a communication system, a method of controlling a power output of a transceiver comprising the steps of:
receiving a signal at a control site from said transceiver;
measuring a power value of said signal;
adjusting said measured power value to compensate for a previous adjustment forming an adjusted power value;
calculating a power slope representing a change of said adjusted power value of said signal between a first previous adjusted power value and said adjusted power value;
calculating a change in power slope representing a rate of change of said power value of said signal using a second previous adjusted power value, said first previous adjusted power value, and said adjusted power value;
predicting a future power value using said adjusted power value, said power slope, and said change in power slope;
modifying said future power value for said previous adjustment forming a modified future power value;
determining a power adjustment command based upon said modified future power value;
reversing a sign of said power adjustment command if said modified future power value crosses a threshold value; and
transmitting said power adjustment command.

7. The method of claim 6 wherein each of said power values is an average power value of said transmitted signal.

8. In a communication system, a method for controlling a power output of a transceiver comprising the steps of:
receiving a signal at a control site from said transceiver;
measuring a power value of said signal;
calculating a prediction error based upon said power value and a preceding estimate of said power value;
updating a prediction coefficient based upon said prediction error;
determining a future power value using said prediction coefficient;
determining a power adjustment command based upon said future power value; and
transmitting said power adjustment command t o said transceiver.

9. The method of claim 8 wherein each of said power values is an average power value of said transmitted signal.

10. In a communication system, a method for controlling a power output of a transceiver comprising the steps of:
receiving a signal at a control site from said transceiver;
measuring a power value of said signal;
calculating a first power slope representing a change of said power value of said signal between a first previous power value and said power value;
calculating a change in power slope representing a rate of change of said power slope of said signal between said first power slope and a second power slope representing a change of said power value of said signal between a second previous power value and said first previous power value;
using said power value, said first power slope, and said change in power slope to determine a predicted future power value;
determining a power adjustment command based upon said predicted future power value; and
transmitting said power adjustment command to said transceiver.

11. The method of claim 10 wherein each of said power values is an average power value of said signal.

12. The method of claim 10 wherein said predicted future power value is modified for a previous power control adjustment.

13. In a communication system, a method for controlling a power output of a transceiver comprising the steps of:
receiving a signal at a control site from said transceiver;
measuring a power value of said signal;
using said power value and a power value model to predict a future power value;
determining a power adjustment command based upon said predicted future power value; and
transmitting said power adjustment command to said transceiver.

14. The method of claim 13 wherein said model is a bell shaped curve.

15. In a communication system, a method for controlling a power output of a transceiver comprising the steps of:
receiving a signal at a control site from said transceiver;
measuring a power value of said signal;
calculating a prediction error based upon said power value and a preceding estimate of said power value;
updating a prediction coefficient based upon said prediction error;
determining said predicted future power value using said prediction coefficient;
determining a power adjustment command based upon said predicted future power value; and
transmitting said power adjustment command to said transceiver.

* * * * *

UNITED STATES PATENT AND TRADEMARK OFFICE
CERTIFICATE OF CORRECTION

PATENT NO. : 5,305,468
DATED : April 19, 1994
INVENTOR(S) : Eugene Bruckert, Fuyun Ling It is certified that error appears in the above-indentified patent and that said Letters Patent is hereby corrected as shown below:

In column 7, line 23: replace "having a second signal" with --having a second sign--.

Signed and Sealed this

Twentieth Day of September, 1994

BRUCE LEHMAN

Attest:

Attesting Officer

Commissioner of Patents and Trademarks